(12) United States Patent
DeJong et al.

(10) Patent No.: US 8,721,092 B2
(45) Date of Patent: *May 13, 2014

(54) WIDE FIELD OF VIEW SUBSTRATE GUIDED RELAY

(75) Inventors: Christian Dean DeJong, Sammamish, WA (US); Markus Duelli, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/467,300

(22) Filed: May 9, 2012

(65) Prior Publication Data
US 2013/0301014 A1 Nov. 14, 2013

(51) Int. Cl.
*G03B 21/28* (2006.01)

(52) U.S. Cl.
USPC ............... 353/99; 353/85; 353/98; 353/122; 349/86; 349/196; 349/202

(58) Field of Classification Search
USPC ............... 353/20, 30, 34, 38, 85, 98, 99, 122; 349/5, 7–9, 86, 196, 202; 359/11, 27, 359/486.01
See application file for complete search history.

(56) References Cited

U.S. PATENT DOCUMENTS

| | | | |
|---|---|---|---|
| 8,506,090 B2 * | 8/2013 | Nicoli et al. | 353/69 |
| 2004/0085649 A1 * | 5/2004 | Repetto et al. | 359/633 |
| 2005/0207313 A1 * | 9/2005 | Handschy et al. | 369/103 |
| 2006/0066812 A1 * | 3/2006 | Yanai | 353/20 |
| 2007/0171329 A1 * | 7/2007 | Freeman et al. | 349/65 |
| 2010/0177287 A1 * | 7/2010 | Sakai et al. | 353/99 |
| 2010/0265467 A1 * | 10/2010 | Lescure et al. | 353/20 |

* cited by examiner

*Primary Examiner* — Sultan Chowdhury
(74) *Attorney, Agent, or Firm* — Kevin D. Wills

(57) ABSTRACT

A substrate guided relay includes multiple output couplers and multiple light valves positioned between the substrate and the output couplers. The number of light valves may be equal to the number of output couplers, or may be more or less than the number of output couplers. The light valves may be enabled sequentially, or may be enabled based on the position of a user's eye. The light valves may include liquid crystal material.

20 Claims, 5 Drawing Sheets

SECTION B-B

WIDE FIELD OF VIEW SUBSTRATE GUIDED RELAY

FIELD

The present invention relates generally to display systems, and more specifically to display systems that utilize substrate guided relays.

BACKGROUND

In the field of substrate-guided optical image relays, reflective, holographic or diffractive elements may cooperate with the surfaces of a relatively thin substrate to guide image rays along the substrate to produce a viewing region. This may be used for example to couple an image produced by a scanning projector or collimated light from a flat panel display to the eye of a viewer in a near-to-eye display and/or to provide a thin form-factor such as a flat panel display.

DESCRIPTION OF EMBODIMENTS

Figure 1:
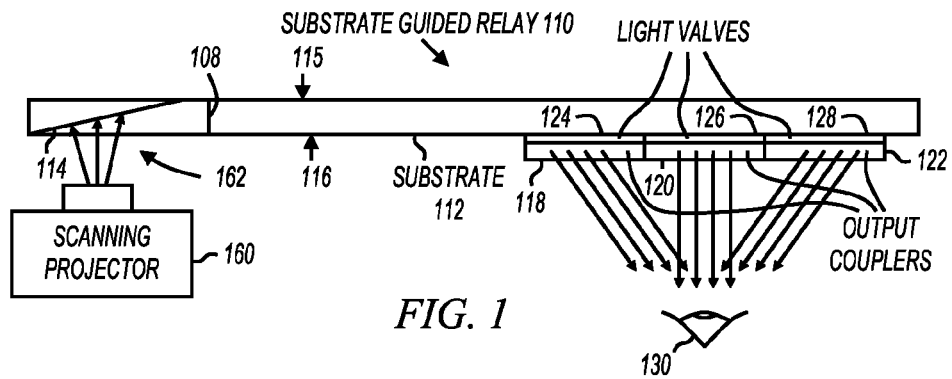
FIG. 1 shows a cross section of a display system with projector collimated image source (scanned beam or collimated flat panel) and a substrate guided relay having multiple light valves and output couplers in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a cross section of a display system with a scanning projector and a substrate guided relay having multiple light valves and output couplers in accordance with various embodiments of the present invention. The system of FIG. 1 includes substrate guided relay 110 and scanning projector 160. Scanning projector 160 is an example of a collimated projector in which light from each pixel is collimated.

Substrate guided relay (SGR) 110 includes a substrate 112, an input coupler 114, an input polarizer 108, multiple output couplers 118, 120, 122, and multiple light valves 124, 126, 128. Input coupler 114 receives light from scanning projector 160 and guides the light to the substrate 112. The light is guided along the substrate through total internal reflection (TIR) or in some cases by use of an optical coating as the light reflects off the SGR surfaces 115, 116. Upon reaching the output couplers, the light is output from the substrate towards a viewing region, where it can be perceived by the eye of a viewer 130. The viewing region may be defined by an eye box wherein substantially the entirety of the image may be perceived.

Input coupler 114 may be formed on or in substrate guided relay 110 in any manner. For example, in some embodiments, input coupler 114 is a diffractive element. In other embodiments, input coupler 114 is a holographic element. In still further embodiments, input coupler 114 includes reflective or partially reflective surfaces within the substrate guided relay. In some embodiments, the input coupler is absent and the light is inserted directly into the body of the substrate guided relay.

Input polarizer 108 polarizes the light within substrate guided relay 110 to be either S or P polarized with respect to surfaces 115, 116. In some embodiments, the polarization of light is used advantageously in the operation of light valves 124, 126, 128. Some embodiments omit polarizer 108, and do not take advantage of polarized light. In still further embodiments, light emanating from scanning projector 160 is polarized, and polarizer 108 is omitted.

Scanning projector 160 scans a beam of light 162 through various angles to form a raster pattern, and modulates the light beam to paint pixels in the raster pattern. A collimated optic on the panel display collimates each pixel at a unique angle and modulates the light from each pixel in each color. Pixels in the image pattern are referred to as being "angle-mapped" because a unique angle (or combination of angles) of the light beam defines the location of each pixel in the raster pattern. Angle-mapped pixels are appropriate for transmission by substrate guided relay 110, in part because the angular information is maintained as the light rays propagate down the substrate and exit at the output couplers. That is, the image produced by the projector is reproduced at the output coupler because the pixels are angle-mapped.

The substrate guided relay operates in the angle space between the TIR angle and parallel to the SGR surfaces 115, 116. This places a fundamental limit on the horizontal field of view (FOV) of the system for a given substrate material when using a single output coupler.

Various embodiments of the present invention employ multiple output couplers to achieve a wide horizontal field of view. As shown in FIG. 1, output couplers 118, 120, 122 are mounted adjacent to one another on an output end of the substrate guided relay. Each of output couplers 118, 120, 122 exhibits a different projection angle such that the light emanating from each output coupler is aimed at the eyebox to be viewed by a user's eye 130. In some embodiments, this is achieved using reflectors at different angles within each output coupler.

Light valves 124, 126, 128 are electrically operated and individually selectable elements that can either transmit or reflect light. For example, if light valve 124 is selected to be "on," then light transmits through light valve 124 and exits output coupler 118. Also for example, if light valve 126 is selected to be "on," then light transmits through light valve 126 and exits output coupler 120. Also for example, if light valve 128 is selected to be "on," then light transmits through light valve 128 and exits output coupler 122. Light valves 124, 126, 128 may be any type of controllable apparatus capable of transmitting or reflecting light. Light valve embodiments utilizing liquid crystal material are described in detail below; however, invention embodiments are not limited to the user of liquid crystal light valves.

In some embodiments, light valves 124, 126, and 128 are selected at different times such that light is projected towards the eyebox from output couplers 118, 120, 122 at different times. For example, in some embodiments, light valves 124, 126, and 128 are selected sequentially as scanning projector 160 projects image content from different portions of the source image.

In some embodiments, employing multiple output couplers results in a wider field of view. For example, the output of each output coupler is designed to be offset from its neighbor by the width of the field of view supported by each output coupler. For three output couplers, each supporting a 40 degree field of view, the output couplers may be arranged so that the leftmost output coupler 118 is centered at −40 degrees (covering −60 degrees to −20 degrees) from the observer, the middle output coupler 120 is centered at 0 degrees (covering −20 degrees to +20 degrees) and the rightmost output coupler is centered at +40 degrees (covering +20 degrees to +60 degrees) for a total field of view of 120 degrees.

In some embodiments, the number of output couplers is equal to the number light valves as shown in FIG. 1. In other embodiments, the number of output couplers is not equal to the number of light valves. For example, the number of output couplers may be greater than, or less than, the number of light valves. Further, in some embodiments, the output couplers are aligned with the light valves so that light transmitted by a light valve exits through a single output coupler as shown in FIG. 1. In other embodiments, light valves and output couplers are not aligned. In some embodiments, opaque material is placed at the junction between output couplers to prevent light transmission from one output coupler to another.

Figure 2:
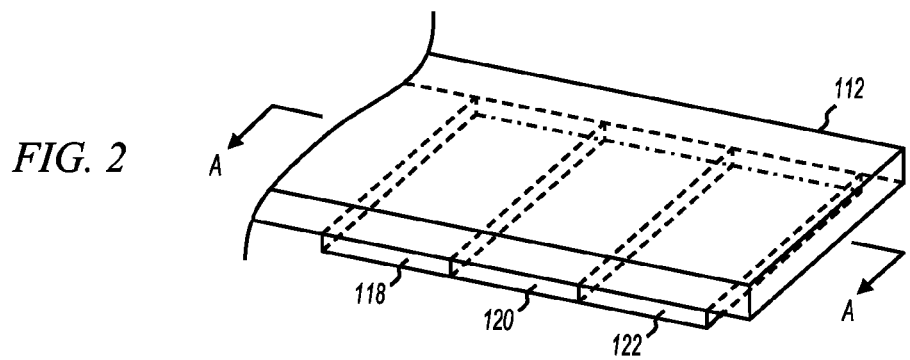
FIG. 2 shows a perspective view of the output end of the substrate guided relay of FIG. 1 in accordance with various embodiments of the present invention.

FIG. 2 shows a perspective view of the output end of the substrate guided relay of FIG. 1 in accordance with various embodiments of the present invention. Substrate 112 is shown with output couplers 118, 120, and 122. Light valves 124, 126, 128 are coupled between the output couplers and the substrate, but are not explicitly shown in FIG. 2.

Figure 3:
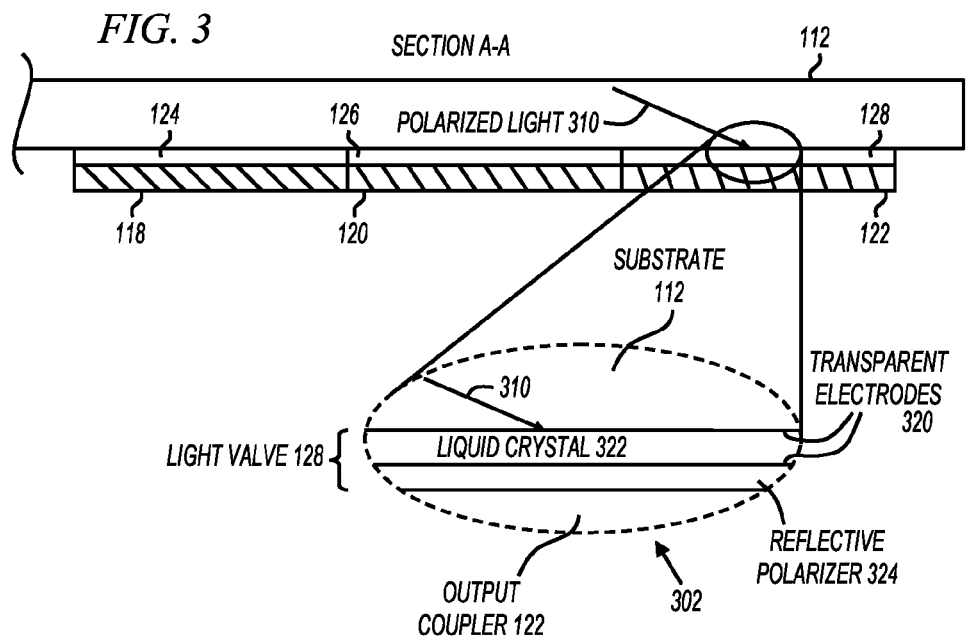
FIG. 3 shows a section view of the subject matter shown in FIG. 2 in accordance with various embodiments of the present invention.

FIG. 3 shows a section view of the subject matter shown in FIG. 2 in accordance with various embodiments of the present invention. Section A-A shows a cross section of the substrate 112, output couplers 118, 120, 122, and light valves 124, 126, and 128. An example ray of polarized light 310 is shown propagating in substrate 112 and impinging on light valve 128. When light valve 128 is selected, then ray 310 is transmitted by light valve 128, and exits the substrate guided relay at output coupler 122. When light valve 128 is not selected, then ray 310 is not transmitted by light valve 128.

Output couplers 118, 120, and 122 are shown with reflectors at different angles to reflect light at different angles. In some embodiments, the reflectors are angled such that light projected from each output coupler is aimed at the eyebox as shown in FIG. 1.

An exploded view 302 is shown. The exploded view includes cross sections of substrate 112, light valve 128, and output coupler 122. Light valve 128 is shown including liquid crystal material 322, transparent electrodes 320, and reflective polarizer 324. In operation, transparent electrodes 320 are electrically coupled to a voltage source to change a voltage potential across liquid crystal material 322. When the voltage is at a first potential, the liquid crystal material passes light without modifying the polarization, and when the voltage is at a second potential, the liquid crystal material rotates the polarization by 90 degrees. Reflective polarizer 324 transmits the light when the light is in a first polarization state, and reflects the light when the light is in a second polarization state.

In some embodiments, polarized light 310 is S polarized with respect to surface of light valve 128, and reflective polarizer 324 transmits light of this same polarization. When liquid crystal material 322 rotates the polarization by 90 degrees, then reflective polarizer reflects the light back in to the substrate, and the light valve is said to be "off." When liquid crystal material 322 does not modify the polarization of the light, then it is transmitted by reflective polarizer 324, and the light valve is said to be "on." In other embodiments, reflective polarizer 324 transmits light that has a polarization state rotated 90 degrees by liquid crystal material 322. Any combination of incident light polarization, polarization rotation/nonrotation by liquid crystal material 322, and polarization state of reflective polarizer 324 may be utilized to create a transmissive state and a nontransmissive state for light valves.

The dimensions of the various components shown in FIG. 3 are not necessarily to scale. For example, reflective polarizer 324 may be implemented as a thin film that is deposited on either the output coupler or the adjacent transparent electrode. Further, the liquid crystal layer may be much thinner than the output coupler. The dimensions have been exaggerated in the figures to aid in illustrating the various elements that may be used in light valves that include liquid crystal material.

In some embodiments, each of the light valves is individually selectable. For example, the transparent electrodes for each of light valves 124, 126, 128 may be isolated and coupled to signal wires that may have different voltage potentials applied. This may be accomplished with individually controlled transistor switches or any other suitable mechanism. In this manner, the polarization state of the liquid crystal layers within each of the light valves may be separately controlled, thereby allowing for individually selection of the light valves.

Liquid crystal material 322 may be any suitable material, including but not limited to materials that exhibit the twisted-nematic effect. The transparent electrodes may also be any suitable material, including but not limited to indium tin oxide.

Figure 4:
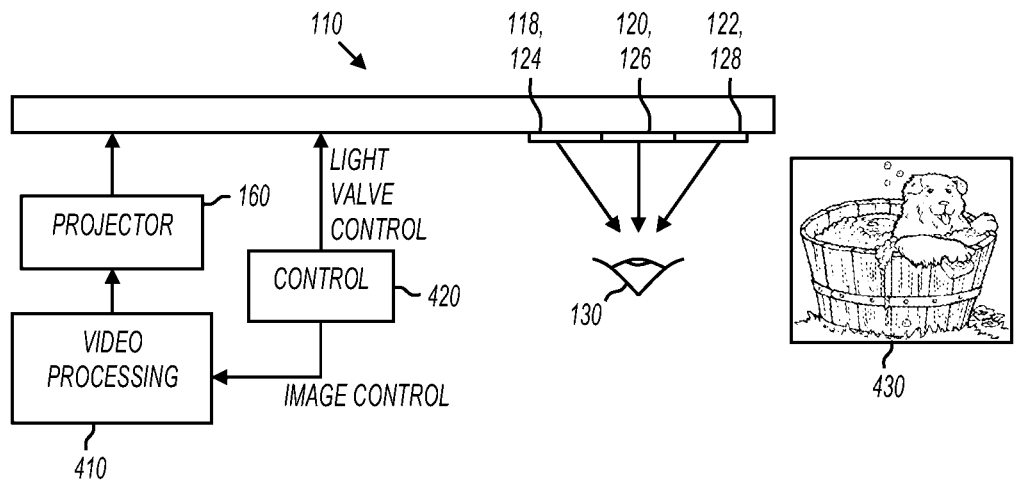
FIG. 4 shows a display system with control circuitry to sequentially enable the light valves in accordance with various embodiments of the present invention.

FIG. 4 shows a display system with control circuitry to sequentially enable the light valves in accordance with various embodiments of the present invention. The display system includes substrate guided relay 110 and projector 160, both of which are described above. The display system also includes video processing circuitry 410 and control circuitry 420. During viewing, a user's eye 130 perceives an entire image area spanning all three output couplers represented by the image at 430. As described more fully below, the entire image area is sequentially transmitted in portions, providing for a wide field of view that spans the total width of the output couplers. The human eye integrates (averages) the displayed content over time and the entire image area is perceived as being projected at once.

In operation, control circuitry 420 sequentially enables the light valves 124, 126, 128, and also commands video processing circuitry 410 to sequentially display different portions of the image area. The sequential operation is illustrated in FIG. 5.

Figure 5:
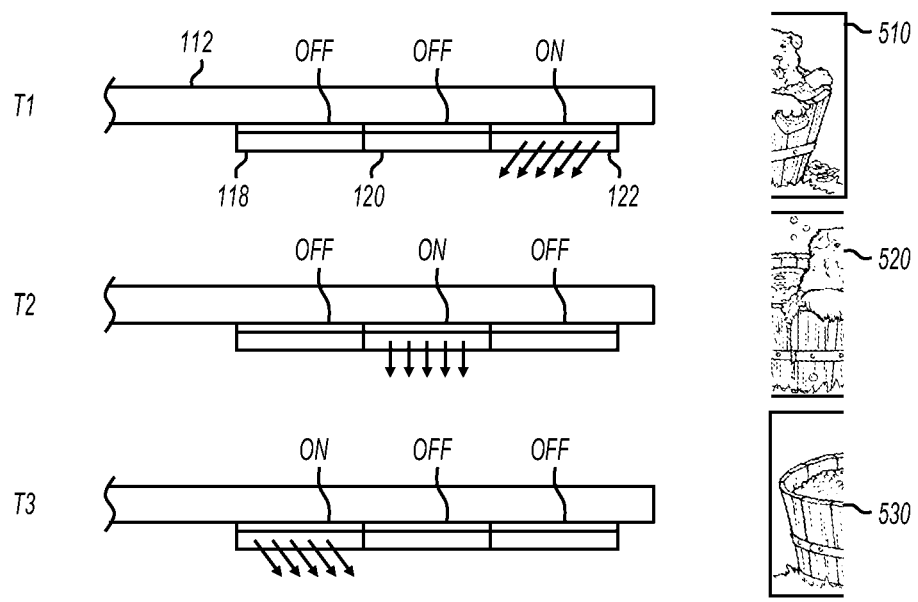
FIG. 5 shows sequential operation of light valves and representative video content in accordance with various embodiments of the present invention.

FIG. 5 shows sequential operation of light valves and representative video content in accordance with various embodiments of the present invention. Times T1, T2, and T3 represent a time sequence, where T3 follows T2 which follows T1. In some embodiments, each of T1, T2, and T3 represent one frame displayed by projector 160. As used herein, the term "frame" refers to one complete laser beam traversal of the projector output or one complete image from a panel display. For example, projector 160 projects one frame each time the scanned laser beam is swept through one raster pattern. This may or may not correspond to one video frame as defined by a source of incoming video data.

At time T1, the rightmost light valve 128 is turned on by control circuitry 420, and video processing circuitry 410 is commanded by control circuitry 420 to produce the rightmost image portion shown at 510. This results in output coupler 122 projecting image portion 510 towards the eyebox. At time T2, the center light valve 126 is turned on by control circuitry 420, and video processing circuitry 410 is commanded by control circuitry 420 to produce the center image portion shown at 520. This results in output coupler 120 projecting image portion 520 towards the eyebox. At time T3, the leftmost light valve 124 is turned on by control circuitry 420, and video processing circuitry 410 is commanded by control circuitry 420 to produce the leftmost image portion shown at 530. This results in output coupler 118 projecting image portion 530 towards the eyebox. In instances where light is able to pass through only one output coupler at a time the field of view of adjacent output couplers can overlap. This will create a larger eyebox. For three output couplers, each supporting a 40 degree field of view, the output couplers may be arranged so that the leftmost output coupler 118 is centered at −20 degrees (covering −40 degrees to 0 degrees) from the observer, the middle output coupler 120 is centered at 0 degrees (covering −20 degrees to +20 degrees) and the rightmost output coupler is centered at +40 degrees (covering +0 degrees to +40 degrees) for a total field of view of 80 degrees but with a larger eyebox than the 120 degree system described above. Smaller amounts of overlap might be used to fill in potential seams between adjacent output couplers.

As shown in FIGS. 4 and 5, different portions of the image area are sequentially projected. In the examples of FIGS. 4 and 5, the image area is divided into three portions, and there are three light valves and three output couplers. In some embodiments, fewer or more light valves, output couplers, and image portions exist. For example, some embodiments include four light valves, four output couplers, and the image area is divided into four portions. Also for example, some embodiments include five or more light valves, five or more output couplers, and the image area is divided into five or more portions.

Increasing the number of light valves and output couplers allows for narrower image portions and reduced angular variation of the light in the substrate guided relay. This improves uniformity and reduces complexity of optical coatings on various system components. Larger numbers of light valves and output couplers also increases eyebox light efficiency as each of the output couplers are aimed at the eyebox.

Figure 6:
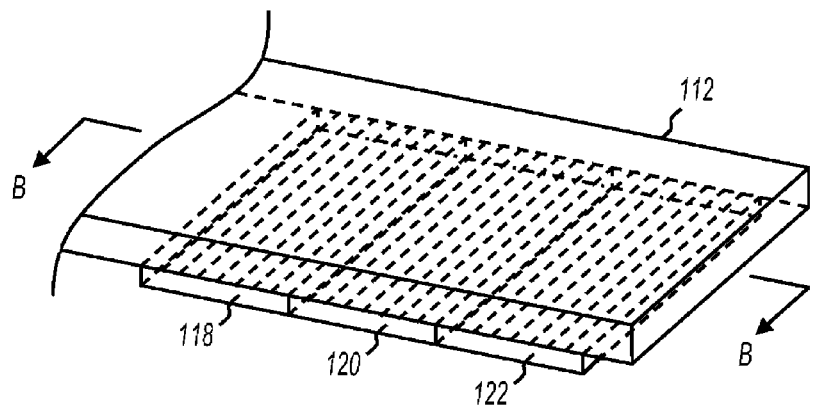
FIG. 6 shows a perspective view of an output end of a substrate guided relay with multiple light valves for each output coupler in accordance with various embodiments of the present invention.

FIG. 6 shows a perspective view of an output end of a substrate guided relay with multiple light valves for each output coupler in accordance with various embodiments of the present invention. The substrate guided relay shown in FIG. 6 is similar to that shown in FIG. 2, except embodiments represented by FIG. 6 include an increased number of light valves. The increased number of light valves is represented by the dashed lines at the junction between the substrate 112 and the output couplers 118, 120, 122.

Figure 7:
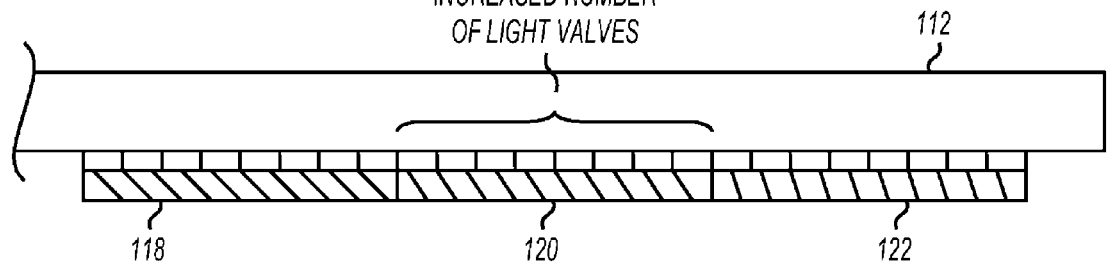
FIG. 7 shows a section view of the subject matter shown in FIG. 6 in accordance with various embodiments of the present invention.

FIG. 7 shows a section view of the subject matter shown in FIG. 6 in accordance with various embodiments of the present invention. FIG. 7 shows substrate 112, output couplers 118, 120, 122, and a plurality of light valves for each output coupler. Eight light valves are shown for each output coupler, however this is not a limitation of the present invention. For example, more or less than eight light valves may exist for each output coupler. Also, in some embodiments, a non-integer number of light valves exist for each output coupler. Any type of light valve may be employed, including light valves with liquid crystal material as described above. In some embodiments, the number of light valves is equal to the number of output coupler reflectors, such that each light valve conditionally transmits light to one reflector. In other embodiments, the number of light valves is not equal to the number of output coupler reflectors.

Figure 8:
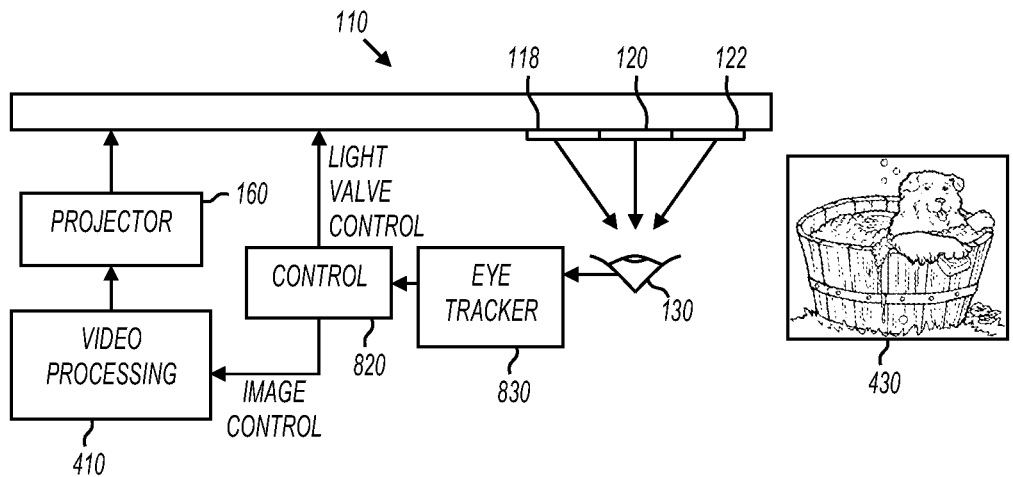
FIG. 8 shows a display system with control circuitry to enable light valves in response to eye position in accordance with various embodiments of the present invention.

FIG. 8 shows a display system with control circuitry to enable light valves in response to eye position in accordance with various embodiments of the present invention. The display system includes substrate guided relay 110 with increased number of light valves, projector 160, and video processing circuitry 410, all of which are described above. The display system also includes eye tracker 830 and control circuitry 820. During viewing, a user's eye 130 perceives an entire image area spanning all three output couplers represented by the image at 430. As described more fully below, the entire image area is transmitted in portions based on the direction that the user's eye is looking (eye position), providing for a wide field of view that spans the total width of the output couplers. The human eye integrates (averages) the displayed content over time and the entire image area is perceived as being projected at once.

In operation, eye tracker 830 tracks the position of the user's eye and provides the eye position information to control circuitry 820. Any known eye tracking technology may be employed without departing from the scope of the present invention. Control circuitry 820 receives the eye position information and commands a plurality of light valves to turn on in the direction the eye is looking Control circuitry 820 also commands video processing circuitry 410 to display different portions of the image area that correspond to the portion of the image being viewed by the user's eye 130. This operation is illustrated in FIG. 9.

Figure 9:
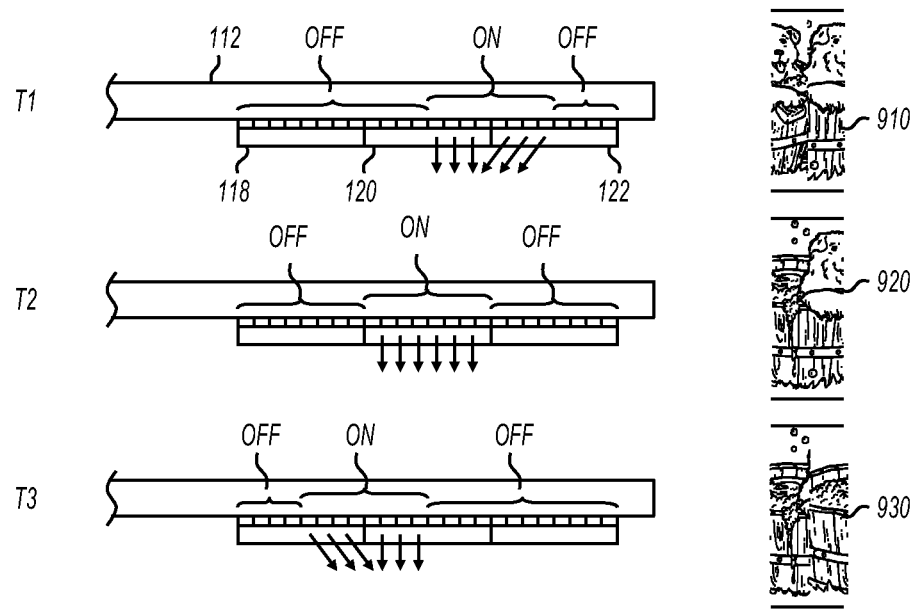
FIG. 9 shows light valve operation in response to eye position and representative video content in accordance with various embodiments of the present invention.

FIG. 9 shows light valve operation in response to eye position and representative video content in accordance with various embodiments of the present invention. Times T1, T2, and T3 represent a time sequence, where T3 follows T2 which follows T1. In some embodiments, each of T1, T2, and T3 represent one frame displayed by projector 160. As used herein, the term "frame" refers to one complete laser beam traversal of the projector output. For example, projector 160 projects one frame each time the scanned laser beam is swept through one raster pattern. This may or may not correspond to one video frame as defined by a source of incoming video data.

At time T1, the eye position is sensed as pointing at the junction between output couplers 120 and 122. Multiple light valves are turned on (enabled) in response. Some of the enabled light valves transmit light to the rightmost output coupler 122, and some of the enabled light valves transmit light to the center output coupler 120. The image portion that corresponds to this viewing area is shown at 910. Note that the left and right halves of the image portion are swapped. The user's eye will perceive the image portion correctly because the image portions are swapped again by virtue of the different projection angles of output couplers 120 and 122. During T1, control circuitry 820 commands video processing circuitry 410 to produce the image portion shown at 910.

At time T2, the eye position is sensed as pointing at the middle of the center output coupler 120. Multiple light valves are turned on (enabled) in response. Because the eye is sensed as looking at the center of one output coupler, the enabled light valves transmit light to that one output coupler 120. The image portion that corresponds to this viewing area is shown at 920. During T2, control circuitry 820 commands video processing circuitry 410 to produce the image portion shown at 920.

At time T3, the eye position is sensed as pointing at the junction between output couplers 118 and 120. Multiple light valves are turned on (enabled) in response. Some of the enabled light valves transmit light to the leftmost output coupler 118, and some of the enabled light valves transmit light to the center output coupler 120. The image portion that corresponds to this viewing area is shown at 930. Note that the left and right halves of the image portion are swapped. The user's eye will perceive the image portion correctly because the image portions are swapped again by virtue of the different projection angles of output couplers 118 and 120. During T3, control circuitry 820 commands video processing circuitry 410 to produce the image portion shown at 930.

In some embodiments, light valves in the center of the field of view are always on, and surrounding light valves are enabled either sequentially or based on eye position. For example, light may be always transmitted to a center output coupler, while eight or more surrounding output couplers may be addressable by a light source of opposite polarization and/or a different color. The surrounding light valves can be turned on and off and may direct light from a separate scanning projector to paint icons to attract the attention of the user in a wider angle space.

Further, in some embodiments, the light valves may be set to allow maximum see-through transmission at any time when light is not being sent in the substrate guided relay for display (blanking frames, overscan, etc.)

Figure 10:
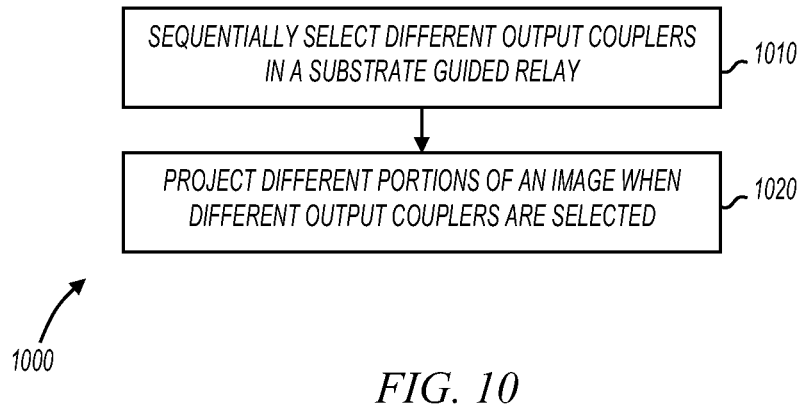
FIGS. 10 and 11 show flowcharts of methods in accordance with various embodiments of the present invention.

FIG. 10 shows a flowchart of a method in accordance with various embodiments of the present invention. In some embodiments, method 1000, or portions thereof, is performed by a display system, embodiments of which are shown in previous figures. In other embodiments, method 1000 is performed by a series of circuits, or a processor that executes instructions, or a combination of the two. Method 1000 is not limited by the particular type of apparatus performing the method. The various actions in method 1000 may be performed in the order presented, or may be performed in a different order. Further, in some embodiments, some actions listed in FIG. 10 are omitted from method 1000.

Method 1000 is shown beginning with block 1010 in which different output couplers are sequentially selected in a substrate guided relay. In some embodiments, this corresponds to control circuitry 420 (FIG. 4) sequentially enabling light valves 124, 126, 128 as shown in FIG. 5. At 1020, different portions of an image are projected when different output couplers are selected. This corresponds to control circuitry 420 sequentially commanding video processing circuitry 410 to output different image portions as shown in FIG. 5.

Figure 11:
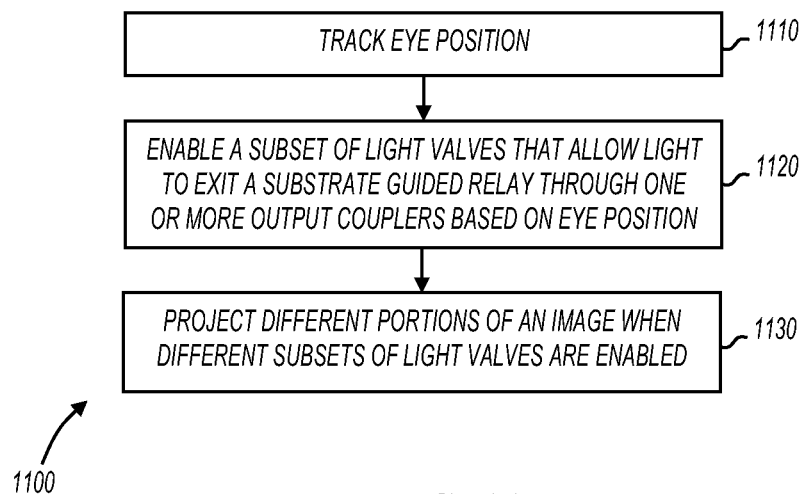

FIG. 11 shows a flowchart of a method in accordance with various embodiments of the present invention. In some embodiments, method 1100, or portions thereof, is performed by a display system, embodiments of which are shown in previous figures. In other embodiments, method 1100 is performed by a series of circuits, or a processor that executes instructions, or a combination of the two. Method 1100 is not limited by the particular type of apparatus performing the method. The various actions in method 1100 may be performed in the order presented, or may be performed in a different order. Further, in some embodiments, some actions listed in FIG. 11 are omitted from method 1100.

Method 1100 is shown beginning with block 1110 in which an eye position is tracked. In some embodiments, this corresponds to eye tracker 830 (FIG. 8) tracking the position of eye 130, and providing eye position information to control circuitry 820. At 1120, a subset of light valves is enabled to allow light to exit a substrate guided relay through one or more output couplers based on eye position. In some embodiments, this corresponds to control circuitry 820 enabling a subset of light valves as shown in FIG. 9. At 1130, different portions of an image are projected when different subsets of light valves are enabled. This corresponds to control circuitry 820 commanding video processing circuitry 410 to output different image portions based on eye position as shown in FIG. 9.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A substrate guided relay comprising:
   a substrate to relay light;
   a plurality of output couplers; and
   a plurality of electrically operated light valves positioned between the substrate and the plurality of output couplers.

2. The substrate guided relay of claim 1 wherein each of the plurality of output couplers is aligned with a corresponding one of the plurality of electrically operated light valves.

3. The substrate guided relay of claim 1 wherein each of the plurality of output couplers is aligned with more than one of the plurality of electrically operated light valves.

4. The substrate guided relay of claim 1 wherein the plurality of output couplers are equal in number to the plurality of electrically operated light valves.

5. The substrate guided relay of claim 1 wherein the plurality of output couplers are fewer in number than the plurality of electrically operated light valves.

6. The substrate guided relay of claim 1 wherein the plurality of electrically operated light valves include liquid crystal material.

7. The substrate guided relay of claim 1 wherein the plurality of electrically operated light valves further include reflective polarizing material.

8. The substrate guided relay of claim 1 further comprising an input polarizer.

9. The substrate guided relay of claim 1 wherein the plurality of output couplers have different projection angles.

10. A display system comprising:
a substrate to relay light;
a plurality of output couplers;
a plurality of electrically operated light valves coupled between the substrate and the plurality of output couplers; and
a control system to sequentially select the electrically operated light valves.

11. The display system of claim 10 wherein the plurality of output couplers have different projection angles.

12. The display system of claim 10 wherein the plurality of electrically operated light valves include liquid crystal material.

13. The display system of claim 12 further comprising a scanning laser projector coupled to project light into the substrate.

14. The display system of claim 13 wherein the scanning laser projector is configured to sequentially project different portions of an image area as the control system sequentially selects different electrically operated light valves.

15. The display system of claim 14 wherein the scanning laser projector is configured to project a different portion of the image area for each projected frame.

16. A display system comprising:
a substrate to relay light;
a plurality of output couplers;
a plurality of individually selectable light valves coupled between the substrate and the plurality of output couplers; and
a control system to track a user's eye position and to select the individually selectable light valves in response thereto.

17. The display system of claim 16 further comprising a scanning laser projector coupled to project light into the substrate.

18. The display system of 17 wherein the scanning laser projector is coupled to be responsive to the control system to modify a projected image based on eye position.

19. The display system of claim 16 wherein the plurality of output couplers have different projection angles.

20. The display system of claim 16 wherein the plurality of electrically operated light valves include liquid crystal material.

* * * * *